US011888965B2

(12) United States Patent
Fang et al.

(10) Patent No.: US 11,888,965 B2
(45) Date of Patent: Jan. 30, 2024

(54) METHOD AND SYSTEM FOR IOT DEVICE DIGITAL ASSET PERMISSION TRANSFER SYSTEM USING BLOCKCHAIN NETWORK

(71) Applicant: MASTERCARD ASIA/PACIFIC PTE. LTD., Singapore (SG)

(72) Inventors: Hui Fang, Singapore (SG); Bensam Joyson, Singapore (SG); Anupam Sharma, North West Singapore (SG); Zunhua Wang, Singapore (SG)

(73) Assignee: MASTERCARD ASIA/PACIFIC PTE. LTD., Singapore (SG)

( * ) Notice: Subject to any disclaimer, the term of this patent is extended or adjusted under 35 U.S.C. 154(b) by 488 days.

(21) Appl. No.: 16/708,630

(22) Filed: Dec. 10, 2019

(65) Prior Publication Data

US 2021/0176039 A1 Jun. 10, 2021

(51) Int. Cl.
*H04L 9/06* (2006.01)
*G06F 21/60* (2013.01)
*H04L 9/30* (2006.01)
*H04L 9/32* (2006.01)
*H04L 9/00* (2022.01)

(52) U.S. Cl.
CPC .......... *H04L 9/0637* (2013.01); *G06F 21/602* (2013.01); *H04L 9/3073* (2013.01); *H04L 9/3239* (2013.01); *H04L 9/3247* (2013.01); *H04L 9/3297* (2013.01); *H04L 9/50* (2022.05)

(58) Field of Classification Search
CPC ... H04L 12/2803; H04L 67/12; H04L 9/3239; H04L 9/3247; H04L 9/3297; H04L 2209/38; H04W 4/005
See application file for complete search history.

(56) References Cited

U.S. PATENT DOCUMENTS

| 2018/0137512 | A1* | 5/2018 | Georgiadis | H04L 9/3236 |
| 2018/0349896 | A1* | 12/2018 | Arora | G06Q 20/383 |
| 2018/0374094 | A1* | 12/2018 | Kohli | G06Q 20/065 |
| 2020/0042971 | A1* | 2/2020 | Eby | G06Q 20/065 |
| 2020/0112555 | A1* | 4/2020 | Brown | H04L 9/0891 |
| 2020/0245150 | A1* | 7/2020 | Zhao | H04W 12/68 |
| 2020/0374106 | A1* | 11/2020 | Padmanabhan | H04L 63/0428 |

FOREIGN PATENT DOCUMENTS

| WO | WO-2018111295 A1 * | 6/2018 | G06F 21/645 |
| WO | WO-2019027445 A1 * | 2/2019 | H04L 63/0435 |

* cited by examiner

*Primary Examiner* — Meng Li
*Assistant Examiner* — Lydia L Noel
(74) *Attorney, Agent, or Firm* — Panitch Schwarze Belisario & Nadel LLP

(57) ABSTRACT

A method for protection of data transfers for internet of things (IoT) devices using a blockchain includes: receiving, by a node in a blockchain network, a data message from an IoT device formatted according to an IoT messaging protocol and including a device identifier associated with the IoT device and encrypted data; generating a new block including one or more data values including the received data message; transmitting the generated new block to one or more additional nodes in the blockchain network; receiving a data request from an external device including an external identifier associated with the external device; verifying permission of the external device to access the encrypted data based on the external identifier and device identifier; and transmitting the encrypted data to the external device.

16 Claims, 5 Drawing Sheets

METHOD AND SYSTEM FOR IOT DEVICE DIGITAL ASSET PERMISSION TRANSFER SYSTEM USING BLOCKCHAIN NETWORK

FIELD

The present disclosure relates to the protection of data transfers for internet of things (IoT) devices, specifically the use of a blockchain to store data regarding IoT devices and permissions thereof for use in protecting data transfers from IoT devices.

BACKGROUND

As technology improves, more and more types of devices, including regular, everyday physical objects that people interact with, are becoming connected to the internet. While undreamt of years ago, in present times it is not uncommon for everyday objects such as refrigerators, weight scales, light bulbs, thermostats, window blinds, and doorbells to all be part of the local network of a person's residence and, by extension, connected to the Internet. While such connectivity provides people with greater convenience, there is often very little protection afforded to people and these devices in terms of security.

Every internet of things (IoT) device is connected to the Internet. However, in many cases there is a lack of security regarding access and usage of these devices. Instead, IoT devices commonly rely on the security of the local network to which they belong, relying on the network's connection to the Internet to provide security. In cases where additional security is provided, it is typically only done via the means of a single code on the IoT device or through a username and password or other relatively simple means of authentication. As a result, there is potential for nefarious actors to take advantage of the greater connectivity of an individual's home through gaining unauthorized access to their IoT devices. Such unauthorized access could result in the nefarious actor causing great inconvenience to an individual and compromising their privacy and security, such as by accessing cameras, unlocking doors, etc.

Thus, there is a need for a system that provides greater security in the transfer of data to and from IoT devices, particularly in a manner that is low cost, easy to implement, and scalable due to the prevalence and vast number of IoT devices that enter the world each day.

SUMMARY

The present disclosure provides a description of systems and methods for protection of data transfers for internet of things (IoT) devices using a blockchain. A blockchain network includes a plurality of nodes, where each node stores a copy of a blockchain and is configured to update the blockchain with data regarding IoT devices including encrypted data received therefrom. The blockchain nodes are connected with an active directory system. When access to the encrypted data for an IoT device is requested, the blockchain nodes verify the identity of the device requesting the encrypted data and determine if the device is permitted through the active directory system before the encrypted data is transmitted to the external device. As blockchains are immutable and also distributed and very scalable, the methods and systems described herein provide for security in the transfer of data from IoT solutions in a manner that is low cost and a low barrier to entry even in cases where a network may have thousands of IoT devices.

A method for protection of data transfers for internet of things devices using a blockchain includes: receiving, by a receiver of a node in a blockchain network, a data message from an internet of things (IoT) device, the data message being formatted according to an IoT messaging protocol and including at least a device identifier associated with the IoT device and encrypted data; generating, by a processor of the node, a new block, where the new block includes a block header and one or more data values, the one or more data values including the received data message and the block header including at least a timestamp, a block reference value, and a data reference value based on the one or more data values; transmitting, by a transmitter of the node, the generated new block to one or more additional nodes in the blockchain network; receiving, by the receiver of the node, a data request from an external device, the data request including at least an external identifier associated with the external device; verifying, by the node, permission of the external device to access the encrypted data based on at least the external identifier and the device identifier; and transmitting, by the transmitter of the node, the encrypted data to the external device.

A system for protection of data transfers for internet of things devices using a blockchain includes: a blockchain network; an internet of things (IoT) device; an external device; and a node in the blockchain network, where the node includes a receiver of a node configured to receive a data message from the IoT device, the data message being formatted according to an IoT messaging protocol and including at least a device identifier associated with the IoT device and encrypted data, a processor configured to generate a new block, where the new block includes a block header and one or more data values, the one or more data values including the received data message and the block header including at least a timestamp, a block reference value, and a data reference value based on the one or more data values, and a transmitter configured to transmit the generated new block to one or more additional nodes in the blockchain network, wherein the receiver of the node is further configured to receive a data request from an external device, the data request including at least an external identifier associated with the external device, the node is configured to verify permission of the external device to access the encrypted data based on at least the external identifier and the device identifier, and the transmitter of the node is further configured to transmit the encrypted data to the external device.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for Protection of Data Transfers of Internet of Things Devices

Figure 1:
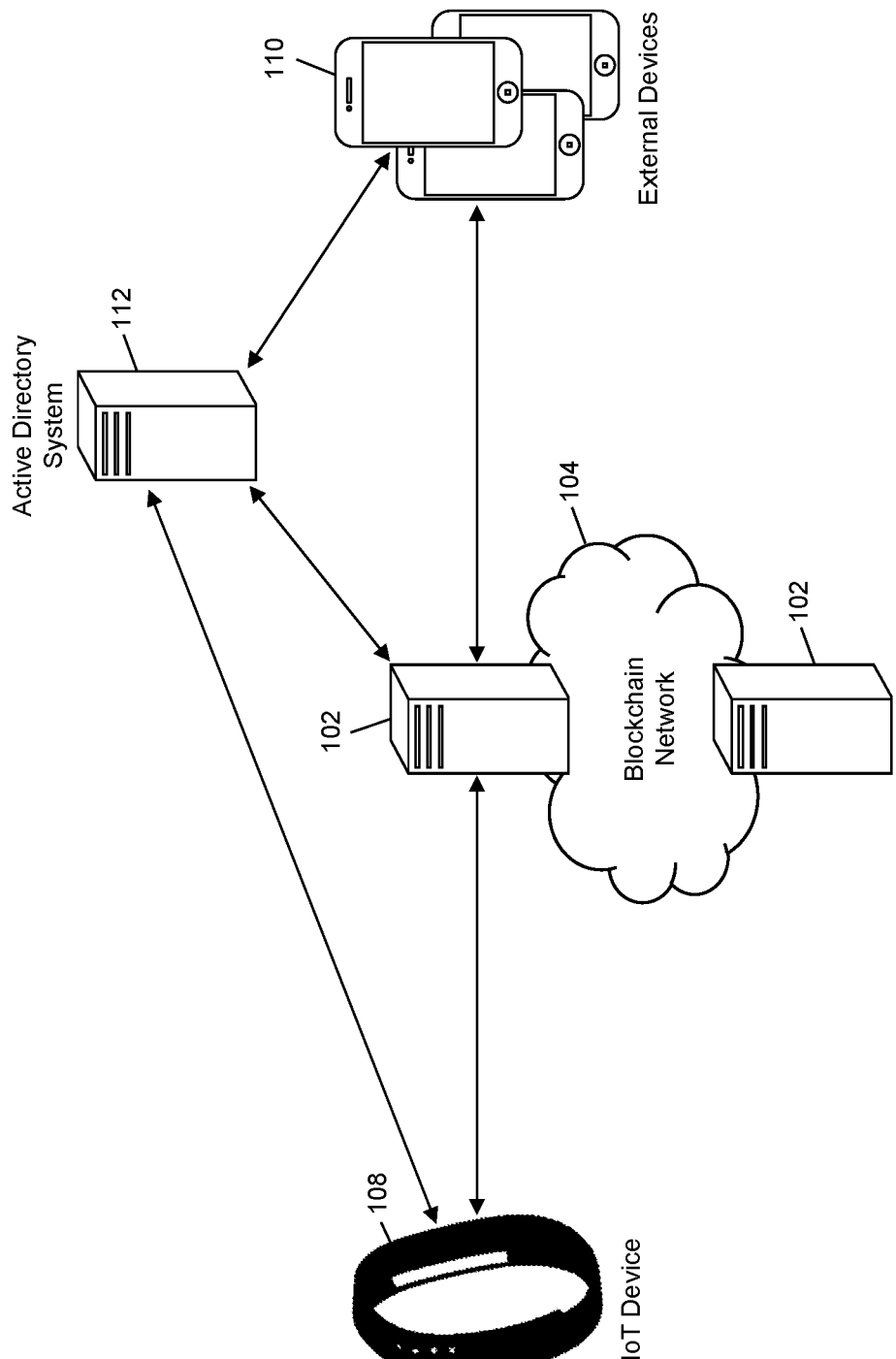
FIG. 1 is a block diagram illustrating a high level system architecture for protecting data transfer involving internet of things devices using blockchain in accordance with exemplary embodiments.

FIG. 1 illustrates a system 100 for the protection of data transfers involving internet of things (IoT) devices through use of a blockchain and data encryption.

Figure 2:
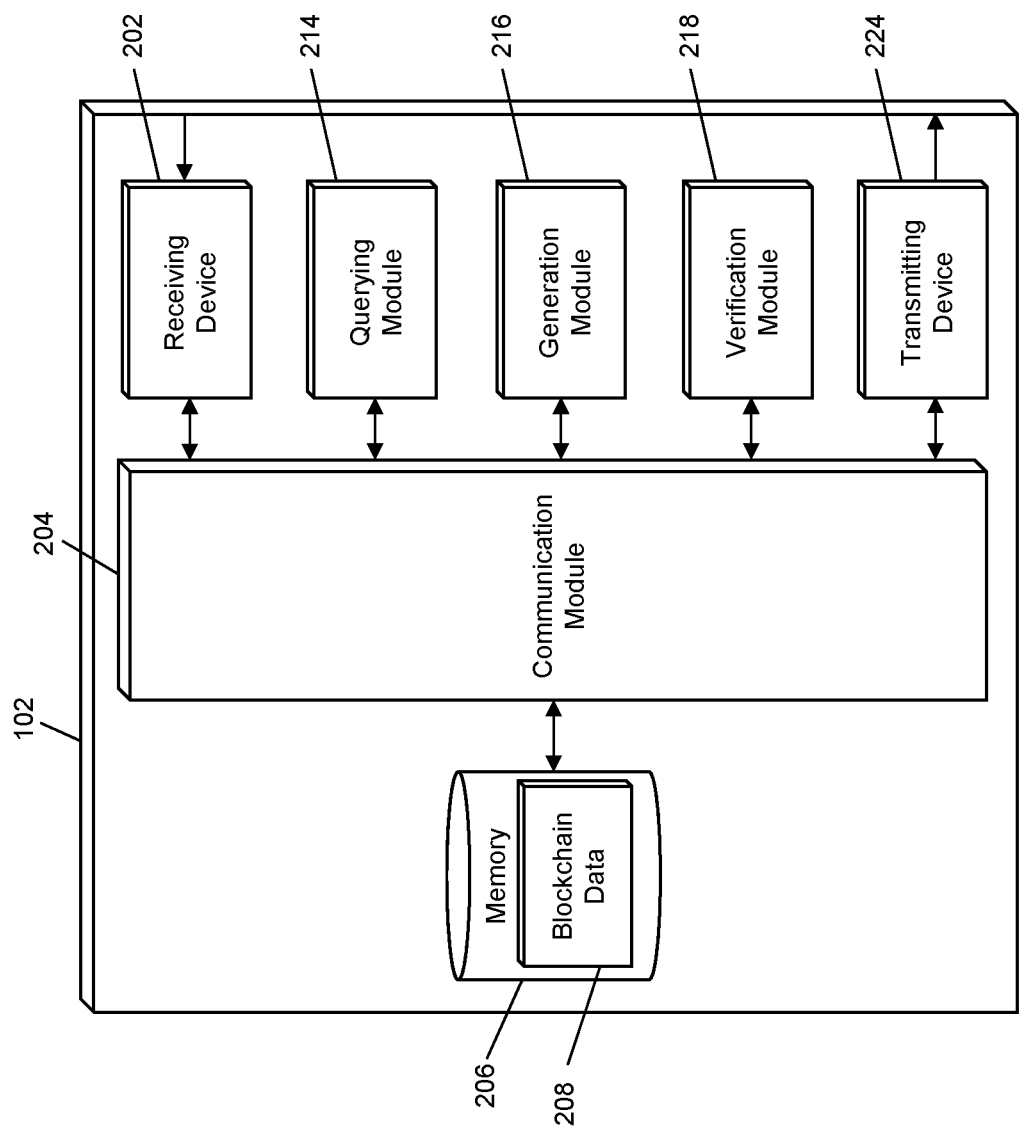
FIG. 2 is a block diagram illustrating a blockchain node of the system of FIG. 1 for protecting data transfers from internet of things devices in accordance with exemplary embodiments.
Figure 5:
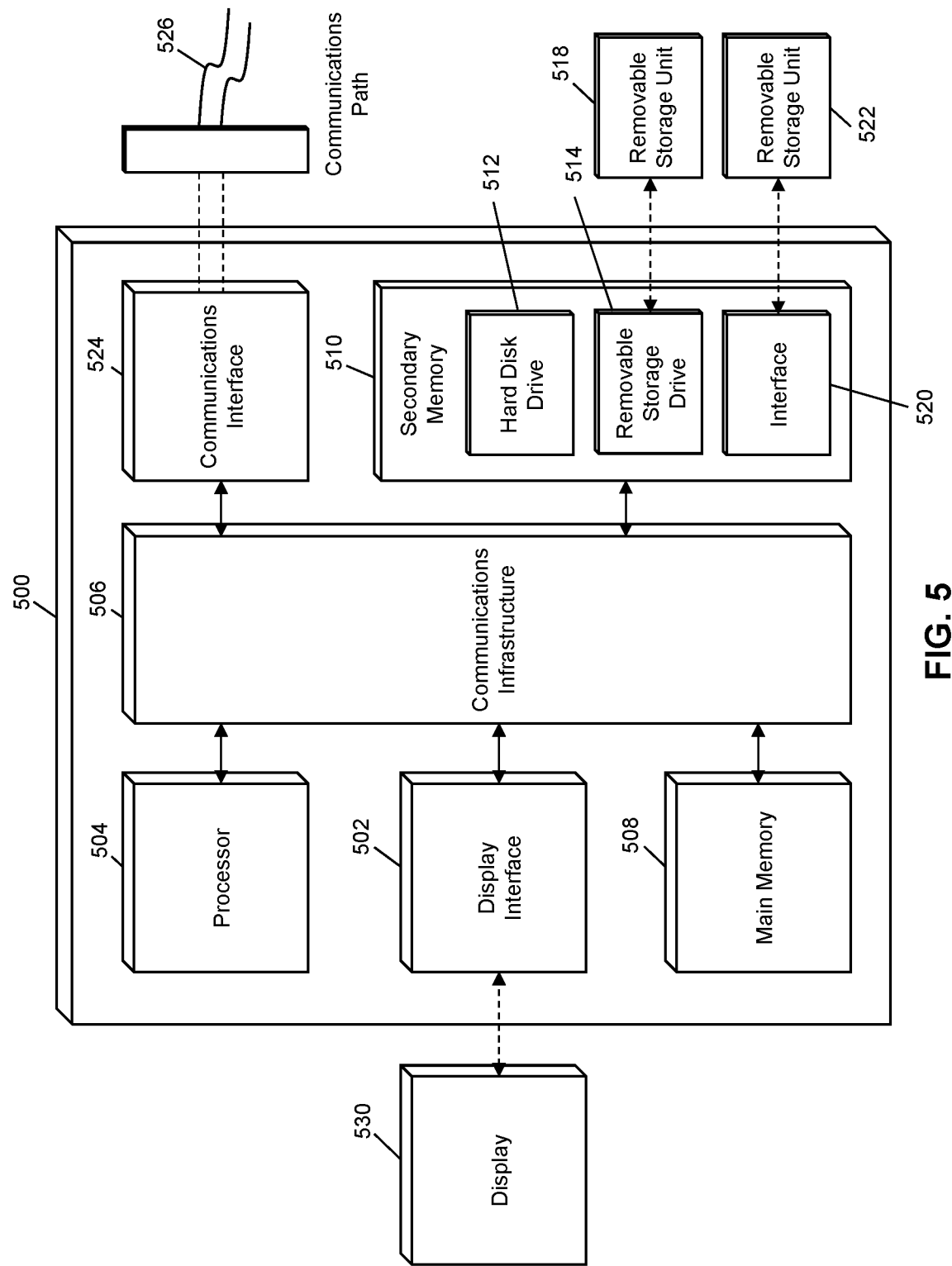
FIG. 5 is a block diagram illustrating a computer system architecture in accordance with exemplary embodiments.

The system 100 may include a plurality of blockchain nodes 102, discussed in more detail below, that comprise a blockchain network 104. Each blockchain node 102 may be a computing system, such as illustrated in FIG. 2 and FIG. 5, discussed in more detail below, that is configured to perform functions related to the processing and management of the blockchain, including the generation of blockchain data values, verification of proposed blockchain transactions, verification of digital signatures, generation of new blocks, validation of new blocks, and maintenance of a copy of the blockchain. The blockchain may be a distributed ledger that is comprised of at least a plurality of blocks. Each block may include at least a block header and one or more data values. Each block header may include at least a timestamp, a block reference value, and a data reference value. The timestamp may be a time at which the block header was generated, and may be represented using any suitable method (e.g., UNIX timestamp, DateTime, etc.). The block reference value may be a value that references an earlier block (e.g., based on timestamp) in the blockchain. In some embodiments, a block reference value in a block header may be a reference to the block header of the most recently added block prior to the respective block. In an exemplary embodiment, the block reference value may be a hash value generated via the hashing of the block header of the most recently added block. The data reference value may similarly be a reference to the one or more data values stored in the block that includes the block header. In an exemplary embodiment, the data reference value may be a hash value generated via the hashing of the one or more data values. For instance, the block reference value may be the root of a Merkle tree generated using the one or more data values.

The use of the block reference value and data reference value in each block header may result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single node in the blockchain network prior to the generation and addition of a new block to the blockchain in order for the change to be made permanent. Computational and communication limitations may make such a modification exceedingly difficult, if not impossible, thus rendering the blockchain immutable.

In some embodiments, the blockchain may be used to store information regarding blockchain transactions conducted between two different blockchain wallets. A blockchain wallet may include a private key of a cryptographic key pair that is used to generate digital signatures that serve as authorization by a payer for a blockchain transaction, where the digital signature can be verified by the blockchain network 104 using the public key of the cryptographic key pair. In some cases, the term "blockchain wallet" may refer specifically to the private key. In other cases, the term "blockchain wallet" may refer to a computing device that stores the private key for use thereof in blockchain transactions. For instance, each computing device may each have their own private key for respective cryptographic key pairs, and may each be a blockchain wallet for use in transactions with the blockchain associated with the blockchain network.

In other embodiments, the blockchain may be used to store any other type of data in an immutable format. For instance, a blockchain may be used to track ownership of land deeds, where changes in ownership may be recorded as direct transfers (e.g., similar to transfers of currency) or where changes may be stored as data. In another example, a blockchain may be used for voting, where votes may be attributed to blockchain wallets and counted accordingly. Other uses for a blockchain for data storage will be apparent to persons having skill in the relevant art. As discussed herein, the storage of any data in a blockchain may be referred to as a "transaction." For instance, in the above example, a change in ownership in land deed or a casted vote in an election may be a "transaction" stored in the blockchain.

In the system 100, the blockchain network 104 may, via the blockchain nodes 102 store a blockchain that is used for the transfer of data from a plurality of IoT devices 108. An IoT device 108 may be any physical object that has a communication interface for connecting to the Internet where data may be sent to and/or from the IoT device using the communication interface. IoT devices 108 may include, for instance, wearable devices, light bulbs, refrigerators, routers, thermostats, window blinds, speakers, home assistant devices, etc. When an IoT device 108 has data to be made available to one or more external devices 110, the IoT device 108 may electronically transmit a data message to a blockchain node 102 using an IoT messaging protocol. In some cases, the messaging protocol may vary based on the type of IoT device 108 involved. For instance, a refrigerator may use one type of IoT messaging protocol, while a home assistant may use a different type of IoT messaging protocol. In another example, every IoT device 108 may use the same protocol as established by a communication standard, but where the data message for communication may be formatted differently based on the type of IoT device 108, data included therein, reason for the message, or other criteria as set forth in the standard.

The data message electronically transmitted from the IoT device 108 to the blockchain node 102 may include at least a device identifier and encrypted data. The device identifier may be a unique identification value that is unique to the IoT device 108, such as an alphanumeric identification string, a registration number, a serial number, etc. In some case, the unique identifier may be a combination of values, such as an identification number and an identifier of the IoT device 108 itself. For example, one IoT device 108 may be a "Step-Tracker 2000" with an identification number of 123456, while a second IoT device 108 may be a "SmartBulb" with an identification number of 123456, where the combination of the make/model of the IoT device 108 with the identification number may serve as the device identifier as used herein.

The encrypted data included in the data message may be an encryption of any data that is to be transferred from the IoT device 108. The data that is encrypted may be based on the IoT device 108 itself, where the data may not affect use of the methods and systems discussed herein. For instance, a refrigerator may have data regarding the contents thereof and temperature settings, while window blinds may have data regarding the current state of the blinds, where each set of data may be encrypted by the respective device and included in a data message, where the processes discussed herein may be the same regardless of the data that is included. Each IoT device 108 may encrypt the data using any suitable format, such as via use of a private key of a cryptographic key pair, use of an encryption key, etc.

The blockchain node 102 may receive the data message from the IoT device 108. In some embodiments, the blockchain node 102 may be configured to validate the IoT device 108 prior to acceptance of the data message for inclusion in the blockchain. For instance, each IoT device 108 may have a cryptographic key pair where the blockchain nodes 102 in the blockchain network 104 are provided the public key of the cryptographic key pair. An IoT device 108 may generate a digital signature using the private key of their cryptographic key pair using a suitable signature generation algorithm, which may be included in or accompanying the data message. The blockchain node 102 may validate the digital signature using the public key and appropriate signature algorithm, such as to ensure that the data message is coming from the IoT device 108 and not a separate device posing as the IoT device 108.

Once the data message has been received, and validated, if applicable, the blockchain node 102 may then generate a blockchain data value that includes the device identifier and encrypted data, and include the blockchain data value in a new block that is generated by the blockchain node 102. The new block may include a block header and one or more blockchain data values, including the newly generated blockchain data value. The block header may include at least a timestamp, a block reference value referring to the most recent block entered in the blockchain prior to the new block (e.g., a hash of the block header of the most recent block), and a data reference value referring to the one or more blockchain data values included in the block (e.g., a root of a Merkle tree generated by hashing each blockchain data value).

The newly generated block may be transmitted to a plurality of other blockchain nodes 102 in the blockchain network 104. Each of the blockchain nodes 102 may confirm the new block, such as by verifying the block reference value and data reference value. The other blockchain nodes 102 may transfer their confirmation of the block back to the blockchain node 102 that generated the block. After the block has been confirmed by other blockchain nodes 102 (e.g., at least a majority of the blockchain nodes 102 in the blockchain network 104, in some embodiments), then the block may be distributed to all of the blockchain nodes 102 in the blockchain network 104 for addition to the blockchain. The blockchain may then include the new block, with the new blockchain data value that includes the data message submitted by the IoT device 108. In an exemplary embodiment, the blockchain may be a private blockchain, where the data stored therein may be inaccessible by an unauthorized device. In such an embodiment, only blockchain nodes 102 may be authorized.

In the system 100, an external device 110 may want to access the encrypted data that was submitted to the blockchain by the IoT device 108. The external device 110 may be any computing device specially configured to perform the functions discussed herein, such as a specially configured desktop computer, laptop computer, tablet computer, notebook computer, wearable computing device, cellular phone, smart phone, smart watch, smart television, other IoT device 108, etc. The external device 110 may submit a data request to a blockchain node 102 in the blockchain network 104 using any suitable communication network and method. For instance, the external device 110 may include an application program executed thereby that is configured to interface with the blockchain node 102 via an application programming interface, which may be used to submit the data request. The data request may include at least an external identifier. The external identifier may be a unique value used for identification of the external device 110 that is unique to that external device 110. As with the device identifier for the IoT devices 108, the external identifier may be a combination of data values, or may be a single value that is unique to the external device 110 among all possible external devices 110. In some cases, the data request may be a request to access all data in the blockchain. In other cases, the data request may be a request to access data for a specific IoT device 108 or a set of IoT devices 108. In such cases, the data request may also include a device identifier for each IoT device 108 for which data is being requested.

The blockchain node 102 may receive the data request and may verify the permission of the external device 110 to access the data for the indicated IoT device(s) 108. In some embodiments, the system 100 may include an active directory system 112. In such embodiments, the active directory system may maintain a database or other type of storage regarding permissions of external devices 110 related to IoT devices 108. In other embodiments, the blockchain network 104 may maintain storage of such information directly, in a centralized location or distributed among each of the blockchain nodes 102. In some instances, the permission information may be stored in the blockchain itself, such as where a new blockchain data value is added each time a permission is added or updated (e.g., to grant or remove permissions from an external device 110), where the blockchain data value includes the device identifier, external identifier, and information regarding the permission (e.g., granted, removed, conditions, etc.). Any time an IoT device 108 wants to grant permission to an external device 110 to access data therefrom, the IoT device 108 may communication such information (e.g., its device identifier and the external identifier for the permitted external device 110) to the active directory system 112 or blockchain node 102 for updating of the data store accordingly. In some cases, permission may be device-based (e.g., based on the external device 110 itself). In other cases, permission may be user-based (e.g., using authentication of a user of an external device 110 without regard for the external device 110 that is being used).

When the external device 110 is requesting the data for an IoT device 108, the blockchain node 102 may receive the data request. In some cases, the external device 110 or a user thereof may be authenticated prior to identifying permission for the external device 110 (e.g., or user, as applicable). In such cases, the data request may include authentication data and the blockchain node 102 may perform an authentication check using the included authentication data. Any suitable type of authentication may be performed. For instance, in one example, the external device 110 may have a cryptographic key pair and may generate a digital signature using the private key of the cryptographic key pair, where the blockchain node 102 may validate the digital signature using a public key of the cryptographic key pair. In a second example, the authentication data may be a username and password for a registered user, which may be checked by the blockchain node 102. In a third example, biometric data may be supplied by a user of the external device 110, which may be checked against a database of registered users' biometric information.

If the external device 110 and/or user are successfully authenticated, if applicable, then, the blockchain node 102 may verify the permission of the external device 110 (e.g., or user, if applicable) to access the data associated with the IoT device 108 (e.g., if specified using a device identifier, or all IoT devices 108 whose data is stored in the blockchain). Verification of the permission may include performing a check to see if the external identifier is approved for access to the IoT device's data in the data store. In cases where the system 100 includes an active directory system 112, the active directory system 112 may be queried for the verification. For instance, in one example, the blockchain node 102 may transmit the device identifier and external identifier to the active directory system 112, where the active directory system 112 may perform the check and provide a result (e.g., approved or denied) to the blockchain node. In another example, the blockchain node 102 may transmit the device identifier for the IoT device 108 to the active directory system 112, which may return a list of all external identifiers approved for access to the IoT device's data, where the blockchain node 102 may check the list to determine if the external device 110 is authorized. In cases where the blockchain node 102 and/or blockchain network 104 stores permission data, the blockchain node 102 may check internally or using the blockchain network 104 to determine if the external identifier is listed as permitted to receive data for the IoT device 108 based on its device identifier.

If the external device 110 is not permitted to receive data regarding the IoT device 108, then the blockchain node 102 may response to the data request with a notification indicating that the data request was denied, which may include a message regarding a lack of authorization of the external device 110 or failed authentication. If the external device 110 is permitted, then the blockchain node 102 may electronically transmit the encrypted data to the external device 110. In some cases, all encrypted data stored in the blockchain and associated with the IoT device 108 may be sent. In other cases, the most recent encrypted data stored in the blockchain may be sent. In yet other cases, the data request may specify data that is requested, such as based on a range of dates (e.g., where encrypted data is identified through timestamps of the block headers) or identifiers that may be additionally included in each blockchain data value. The external device 110 may receive the encrypted data, which may then be decrypted using any suitable method. For instance, when the external device 110 is first provided permission by the IoT device 108, the IoT device 108 may provide a decryption key to the external device 110, or the devices may exchange keys in cryptographic key pairs to enable decryption by the external device 110.

The methods and systems discussed herein enable data transfers from IoT devices 108 to external devices 110 in a manner that is secured via the use of a blockchain. A blockchain enables an immutable and scalable solution that provides for protection and auditability of data transfers and access. The use of permissions, either directly by the blockchain network 104 or through an active directory system 112, ensure that only authorized external devices 110 or users can access data of IoT devices 108, where encryption is also used to ensure that transferred data is only readable by external devices 110 with proper keys, to provide for a second layer of security. As such, the methods and systems discussed herein provide for significantly higher security than traditional systems with a solution that is low cost, easy to adopt, and scalable to any size of network and number of IoT devices 108.

Blockchain Node

FIG. 2 illustrates an embodiment of a blockchain node 102 in the system 100. It will be apparent to persons having skill in the relevant art that the embodiment of the blockchain node 102 illustrated in FIG. 2 is provided as illustration only and may not be exhaustive to all possible configurations of the blockchain node 102 suitable for performing the functions as discussed herein. For example, the computer system 500 illustrated in FIG. 5 and discussed in more detail below may be a suitable configuration of the blockchain node 102.

The blockchain node 102 may include a receiving device 202. The receiving device 202 may be configured to receive data over one or more networks via one or more network protocols. In some instances, the receiving device 202 may be configured to receive data from other blockchain nodes 102, internet of things (IoT) devices 108, external devices 110, active directory systems 112, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by other blockchain nodes 102 that are superimposed or otherwise encoded with new blocks for confirmation or for addition to the blockchain. The receiving device 202 may also be configured to receive data signals electronically transmitted by IoT devices 108 that may be superimposed or otherwise encoded with data messages, which may include a device identifier and encrypted data, and may also be accompanied by a digital signature generated by the IoT device 108. The receiving device 202 may be further configured to receive data signals electronically transmitted by external devices 110, which may be superimposed or otherwise encoded with data requests, which may include at least an external identifier, and may also include and/or be accompanied by device identifiers for IoT devices 108 and/or authentication data. The receiving device 202 may also be configured to receive data signals electronically transmitted by active directory systems 112 that may be superimposed or otherwise encoded with permission data, such as a list of external identifiers permitted by an IoT device 108 or a result of a permission check for a specific external device 110 for an IoT device 108.

The blockchain node 102 may also include a communication module 204. The communication module 204 may be configured to transmit data between modules, engines, databases, memories, and other components of the blockchain node 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the blockchain node 102 and external components of the blockchain node 102, such as externally connected databases, display devices, input devices, etc. The blockchain node 102 may also include a processing device. The processing device may be configured to perform the functions of the blockchain node 102 discussed herein as will be apparent to persons having skill in the relevant art. In some embodiments, the processing device may include and/or be comprised of a plurality of engines and/or modules specially configured to perform one or more functions of the processing device, such as a querying module 214, generation module 216, verification module 218, etc. As used herein, the term "module" may be software or hardware particularly programmed to receive an input, perform one or more processes using the input, and provides an output. The input, output, and processes performed by various modules will be apparent to one skilled in the art based upon the present disclosure.

The blockchain node 102 may also include a memory 206. The memory 206 may be configured to store data for use by the blockchain node 102 in performing the functions discussed herein, such as public and private keys, symmetric keys, etc. The memory 206 may be configured to store data using suitable data formatting methods and schema and may be any suitable type of memory, such as read-only memory, random access memory, etc. The memory 206 may include, for example, encryption keys and algorithms, communication protocols and standards, data formatting standards and protocols, program code for modules and application programs of the processing device, and other data that may be suitable for use by the blockchain node 102 in the performance of the functions disclosed herein as will be apparent to persons having skill in the relevant art. In some embodiments, the memory 206 may be comprised of or may otherwise include a relational database that utilizes structured query language for the storage, identification, modifying, updating, accessing, etc. of structured data sets stored therein. The memory 206 may be configured to store, for example, cryptographic keys, salts, nonces, communication information for the back-end system, etc.

The memory 206 may be configured to store algorithms for use in generating blocks for the blockchains and validating digital signatures, information for performing authentication checks, permission data for IoT devices 108, and other data for use in performing the functions of the blockchain node 102 as discussed herein. The memory 206 may also include blockchain data 208. The blockchain data 208 may include the blockchain used to store the IoT data as well as any other information used in performing functions related to the blockchain network 104, such as network addresses, hashing algorithms, etc.

The blockchain node 102 may include a querying module 214. The querying module 214 may be configured to execute queries on databases to identify information. The querying module 214 may receive one or more data values or query strings, and may execute a query string based thereon on an indicated database, such as the memory 206 of the blockchain node 102 to identify information stored therein. The querying module 214 may then output the identified information to an appropriate engine or module of the blockchain node 102 as necessary. The querying module 214 may, for example, execute a query on the blockchain data 208 of the blockchain node 102 to identify encrypted data stored in a blockchain data value for transmission to a permitted and authorized external device 110 or execute a query on the memory 206 to update permission data for an IoT device 108.

The blockchain node 102 may also include a generation module 216. The generation module 216 may be configured to generate data for use by the blockchain node 102 in performing the functions discussed herein. The generation module 216 may receive instructions as input, may generate data based on the instructions, and may output the generated data to one or more modules of the blockchain node 102. For example, the generation module 216 may be configured to generate headers and blockchain data values that are included in new blocks generated for the blockchain in the blockchain network 104.

The blockchain node 102 may also include a verification module 218. The verification module 218 may be configured to perform verifications for the blockchain node 102 as part of the functions discussed herein. The verification module

218 may receive instructions as input, which may also include data to be used in performing a verification, may perform a verification as requested, and may output a result of the verification to another module or engine of the blockchain node 102. The verification module 218 may, for example, be configured to validate digital signatures, perform authentication of an external device 110 and/or a user thereof, and verify that an external device 110 is permitted to receive data related to an IoT device 108 either through local permission data or via the active directory system 112.

The blockchain node 102 may also include a transmitting device 224. The transmitting device 224 may be configured to transmit data over one or more networks via one or more network protocols. In some instances, the transmitting device 224 may be configured to transmit data to other blockchain nodes 102, IoT devices 108, external devices 110, active directory systems 112, and other entities via one or more communication methods, local area networks, wireless area networks, cellular communication, Bluetooth, radio frequency, the Internet, etc. In some embodiments, the transmitting device 224 may be comprised of multiple devices, such as different transmitting devices for transmitting data over different networks, such as a first transmitting device for transmitting data over a local area network and a second transmitting device for transmitting data via the Internet. The transmitting device 224 may electronically transmit data signals that have data superimposed that may be parsed by a receiving computing device. In some instances, the transmitting device 224 may include one or more modules for superimposing, encoding, or otherwise formatting data into data signals suitable for transmission.

The transmitting device 224 may be configured to electronically transmit data signals to other blockchain nodes 102, which may be superimposed or otherwise encoded with new blocks for confirmation, confirmations of received blocks, or new blocks for addition to the blockchain. The transmitting device 224 may also be configured to electronically transmit data signals to IoT devices 108, such as may be superimposed or otherwise encoded with requests for keys or permission data. The transmitting device 224 may be further configured to electronically transmit data signals to external devices 110 that may be superimposed or otherwise encoded with notifications regarding lack of authorization for IoT device data or encrypted data from an IoT device 108 in response to a data request. The transmitting device 224 may also be configured to electronically transmit data signals to active directory systems 112, which may be superimposed or otherwise encoded with requests for permissions data, which may include a device identifier and may also include an external identifier.

Process for Protection of IoT Data Transfers

Figure 3:
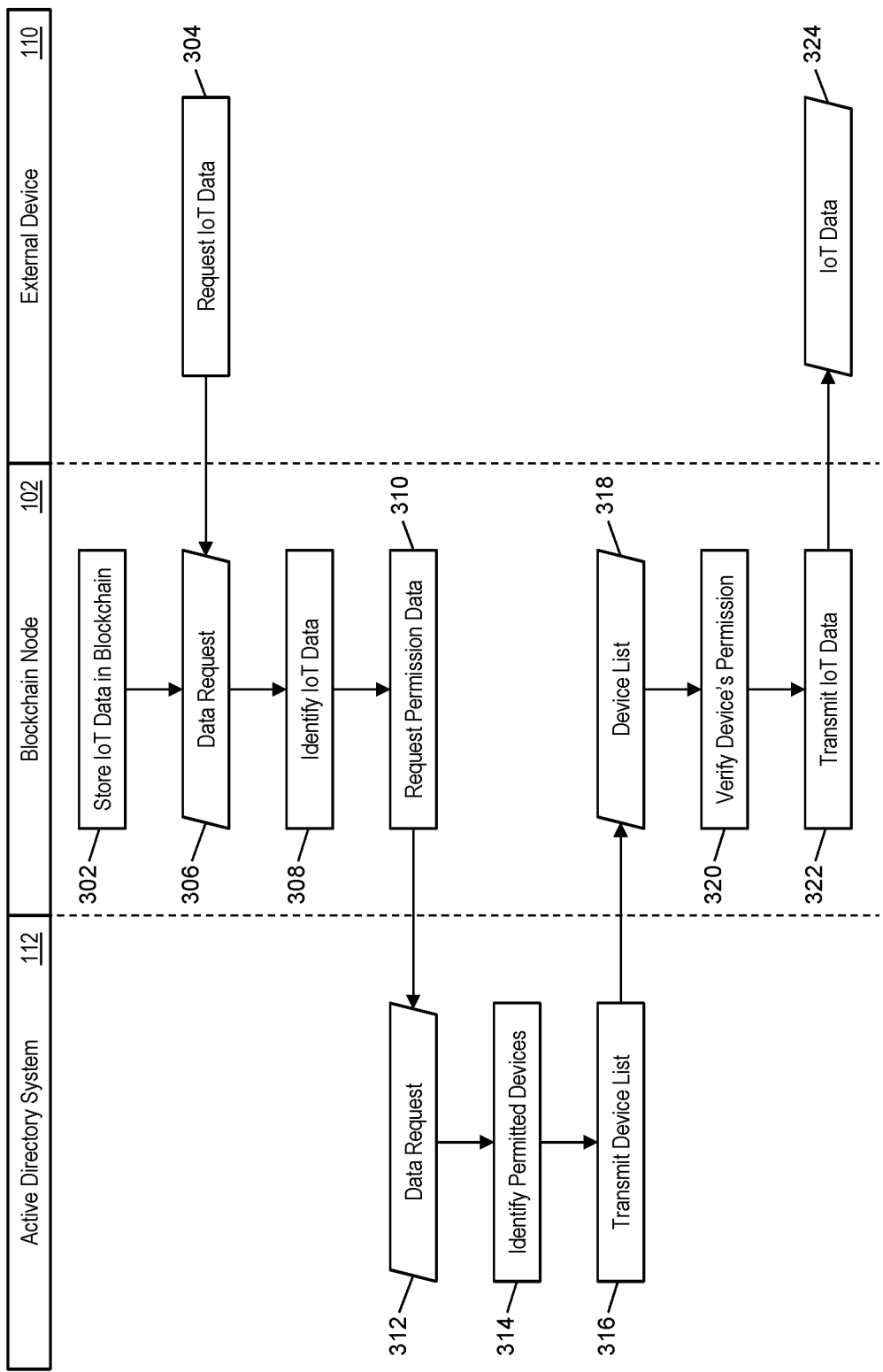
FIG. 3 is a flow diagram illustrating a process for protecting data transfers for internet of things devices using blockchain in the system of FIG. 1 in accordance with exemplary embodiments.

FIG. 3 illustrates an example process executed in the system 100 of FIG. 1 for the protection of data transfers from an internet of things (IoT) device 108 to an external device 110 through the use of a blockchain and active directory system 112.

In step 302, the blockchain node 102 may store IoT data in a blockchain for the blockchain network 104, such as in the blockchain data 208 in the memory 206 of the blockchain node 102. The IoT data may include a device identifier associated with an IoT device 108 and encrypted data received therefrom, which may be included in a blockchain data value that is included in a new block generated for the blockchain that is confirmed by a plurality of other blockchain nodes 102 in the blockchain network 104 and added to the blockchain. In step 304, the external device 110 may submit a data request for data of the IoT device 108 to the blockchain node 102 using a suitable communication network and method. The data request may include at least the external identifier associated with the external device 110, and may also include the device identifier associated with the IoT device 108 for which the external device 110 is requesting data. In step 306, the receiving device 202 of the blockchain node 102 may receive the data request from the external device 110.

In step 308, the querying module 214 of the blockchain node 102 may execute a query on the memory 206 of the blockchain node 102 to identify the encrypted data associated with the IoT device 108 that is being requested, based on the information included in the data request. In step 310, the transmitting device 224 of the blockchain node 102 may electronically transmit a request for permission data to the active directory system 112 using a suitable communication network and method. The request for permission data may include the device identifier for the IoT device 108 for which data is being requested. In step 312, the active directory system 112 may receive the data request.

In step 314, the active directory system 112 may identify all of the external devices 110 that are permitted to access data of the IoT device 108 that is indicated via the device identifier included in the received data request. The active directory system 112 may compile a list of the external identifiers for each of the permitted external devices 110, which may be electronically transmitted to the blockchain node 102 by the active directory system 112, in step 316. In step 318, the receiving device 202 of the blockchain node 102 may receive the list of permitted external identifiers.

In step 320, the verification module 218 of the blockchain node 102 may verify the permission of the external device 110 to access the data for the indicated IoT device 108. The verification may be based on a check for the external identifier associated with the external device 110, included in the submitted data request, in the list of permitted external identifiers received from the active directory system 112. In step 322, the transmitting device 224 of the blockchain node 102 may electronically transmit the encrypted data identified for the IoT device 108 to the external device 110 in response to the submitted data request. In step 324, the external device 110 may receive the encrypted data of the IoT device 108, which it may then decrypt and utilize.

Exemplary Method for Protection of Data Transfers for IoT Devices

Figure 4:
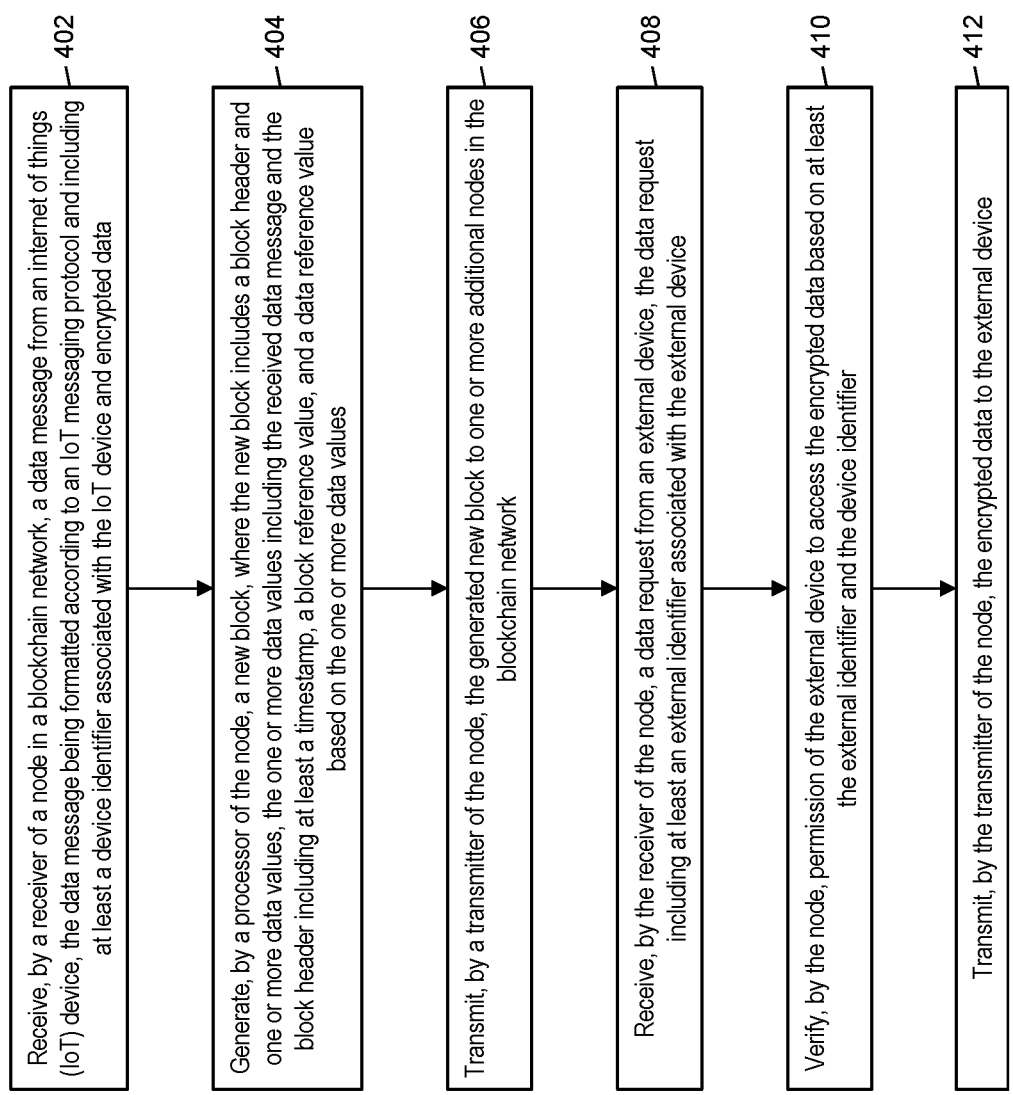
FIG. 4 is a flow chart illustrating an exemplary method for protection of data transfers for internet of things devices using a blockchain in accordance with exemplary embodiments.

FIG. 4 illustrates a method 400 for the protection of data transfers for internet of things devices using a blockchain and device permissions.

In step 402, a data message may be received by a receiver (e.g., the receiving device 202) of a node (e.g., blockchain node 102) in a blockchain network (e.g., the blockchain network 104) from an internet of things (IoT) device (e.g., IoT device 108), the data message being formatted according to an IoT messaging protocol and including at least a device identifier associated with the IoT device and encrypted data. In step 404, a new block may be generated by a processor (e.g., the generation module 216) of the node, where the new block includes a block header and one or more data values, the one or more data values including the received data message and the block header including at least a timestamp, a block reference value, and a data reference value based on the one or more data values. In step 406, the generated new block may be transmitted by a transmitter (e.g., the transmitting device 224) of the node to one or more additional nodes in the blockchain network.

In step 408, a data request may be received by the receiver of the node from an external device (e.g., external device 110), the data request including at least an external identifier associated with the external device. In step 410, permission of the external device to access the encrypted data may be verified by the node based on at least the external identifier and the device identifier. In step 412, the encrypted data may be transmitted to the external device by the transmitter of the node.

In one embodiment, verifying permission of the external device may include: transmitting, by the transmitter of the node, the external identifier and device identifier to an active directory system (e.g., active directory system 112), and receiving, by the receiver of the node, a verification result from the active directory system, where the verification result indicates successful verification of the permission of the external device. In some embodiments, verifying permission of the external device may include: transmitting, by the transmitter of the node, the device identifier to an active directory system, receiving, by the receiver of the node, a list of identifiers associated with the device identifier from the active directory system, and verifying, by the processor (e.g., verification module 218) of the node, that the external identifier is included in the received list of identifier.

In one embodiment, verifying permission of the external device may include: storing, in a memory (e.g., the memory 206) of the node, a list of identifiers associated with the device identifier, and verifying, by the processor of the node, that the external identifier is included in the received list of identifiers. In a further embodiment, the list of identifiers may be stored in an earlier block in a blockchain that includes the generated new block.

In some embodiments, the data message may further include a digital signature. In a further embodiment, the method 400 may further include validating, by the processor of the node, the digital signature prior to generating the new block. In an even further embodiment, the method 400 may also include storing, in a memory of the node, a public key of a cryptographic key pair associated with the device identifier, wherein the digital signature is validated using the public key.

Computer System Architecture

FIG. 5 illustrates a computer system 500 in which embodiments of the present disclosure, or portions thereof, may be implemented as computer-readable code. For example, the blockchain nodes 102 of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for protection of data transfers for internet of things devices using a blockchain. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for protection of data transfers for internet of things devices using a blockchain, comprising:
receiving, by a receiver of a node in a blockchain network, a data message from an internet of things (IoT) device, the data message being formatted according to an IoT messaging protocol and including at least a device identifier associated with the IoT device and encrypted data;
generating, by a processor of the node in the blockchain network, a new block, including a block header and one or more data values, wherein the one or more data values includes the received data message, which includes (i) at least the device identifier associated with the IoT device from which the data message is received, and (ii) the encrypted data, and wherein the block header includes at least a timestamp, a block reference value, and a data reference value based on the one or more data values;
transmitting, by a transmitter of the node in the blockchain network, the generated new block to a plurality of additional nodes in the blockchain network;
confirming, by each additional node of the plurality of additional nodes in the blockchain network, the new block by verifying the block reference value and data reference value;
receiving, by the node of the blockchain network, confirmation of the new block from each additional node of the plurality of additional nodes;
upon receiving confirmation of the new block, transmitting, by the transmitter of the node in the blockchain network, the new block to all of the blockchain nodes in the blockchain network for addition to the blockchain;
receiving, by the receiver of the node, a data request from an external device, the data request including at least an external identifier associated with the external device;
verifying, by the node, permission of the external device to access the encrypted data based on at least the external identifier and the device identifier by accessing permission information stored in an active directory system that is external to the blockchain network, said permission information includes at least the external identifier, the device identifier and information regarding the permission; and transmitting, by the transmitter of the node, the encrypted data to the external device.

2. The method of claim 1, wherein verifying permission of the external device includes transmitting, by the transmitter of the node, the external identifier and device identifier to an active directory system; and receiving, by the receiver of the node, a verification result from the active directory system, where the verification result indicates successful verification of the permission of the external device.

3. The method of claim 1, wherein verifying permission of the external device includes transmitting, by the transmitter of the node, the device identifier to an active directory system;

receiving, by the receiver of the node, a list of identifiers associated with the device identifier from the active directory system; and verifying, by the processor of the node, that the external identifier is included in the received list of identifier.

4. The method of claim 1, wherein verifying permission of the external device includes storing, in a memory of the node, a list of identifiers associated with the device identifier; and verifying, by the processor of the node, that the external identifier is included in the received list of identifiers.

5. The method of claim 4, wherein the list of identifiers is stored in an earlier block in a blockchain that includes the generated new block.

6. The method of claim 1, wherein the data message further includes a digital signature.

7. The method of claim 6, further comprising:

validating, by the processor of the node, the digital signature prior to generating the new block.

8. The method of claim 7, further comprising:

storing, in a memory of the node, a public key of a cryptographic key pair associated with the device identifier, wherein the digital signature is validated using the public key.

9. A system for protection of data transfers for internet of things devices using a blockchain, comprising:

a blockchain network;

an internet of things (IoT) device;

an external device; and a node in the blockchain network, where the node includes a receiver configured to receive a data message from the IoT device, the data message being formatted according to an IoT messaging protocol and including at least a device identifier associated with the IoT device and encrypted data, a processor configured to generate a new block including a block header and one or more data values, wherein the one or more data values includes the received data message, which includes (i) at least the device identifier associated with the IoT device from which the data message is received, and (ii) the encrypted data, and wherein the block header includes at least a timestamp, a block reference value, and a data reference value based on the one or more data values, and a transmitter configured to transmit the generated new block to a plurality of additional nodes in the blockchain network where a confirmation process of the new block occurs by the plurality of additional nodes verifying the block reference value and data reference value, wherein the receiver is further configured to receive confirmation of the new block from each additional node of the plurality of additional nodes, upon the receiver receiving confirmation of the new block, the transmitter is further configured to transmit the new block to all of the blockchain nodes in the blockchain network for addition to the blockchain, the receiver is further configured to receive a data request from an external device, the data request including at least an external identifier associated with the external device, the node is configured to verify permission of the external device to access the encrypted data based on at least the external identifier and the device identifier by accessing permission information stored in an active directory system that is external to the blockchain network, said permission information includes at least the external identifier, the device identifier and information regarding the permission, and the transmitter is further configured to transmit the encrypted data to the external device.

10. The system of claim 9, wherein verifying permission of the external device includes transmitting, by the transmitter of the node, the external identifier and device identifier to an active directory system; and receiving, by the receiver of the node, a verification result from the active directory system, where the verification result indicates successful verification of the permission of the external device.

11. The system of claim 9, wherein verifying permission of the external device includes transmitting, by the transmitter of the node, the device identifier to an active directory system;

receiving, by the receiver of the node, a list of identifiers associated with the device identifier from the active directory system; and verifying, by the processor of the node, that the external identifier is included in the received list of identifier.

12. The system of claim 9, wherein verifying permission of the external device includes storing, in a memory of the node, a list of identifiers associated with the device identifier; and verifying, by the processor of the node, that the external identifier is included in the received list of identifiers.

13. The system of claim 12, wherein the list of identifiers is stored in an earlier block in a blockchain that includes the generated new block.

14. The system of claim 9, wherein the data message further includes a digital signature.

15. The system of claim 14, wherein the processor of the node is further configured to verify the digital signature prior to generating the new block.

16. The system of claim 15, wherein the node further includes a memory configured to store a public key of a cryptographic key pair associated with the device identifier, and the digital signature is validated using the public key.

* * * * *